(12) United States Patent
Cao et al.

(10) Patent No.: US 11,088,625 B1
(45) Date of Patent: Aug. 10, 2021

(54) THREE-PHASE CLLC BIDIRECTIONAL DC-DC CONVERTER AND A METHOD FOR CONTROLLING THE SAME

(71) Applicant: INSTITUTE OF ELECTRICAL ENGINEERING, CHINESE ACADEMY OF SCIENCES, Beijing (CN)

(72) Inventors: Guoen Cao, Beijing (CN); Yibo Wang, Beijing (CN); Rui Cao, Beijing (CN); Zhe Wang, Beijing (CN); Yong Zhao, Beijing (CN)

(73) Assignee: INSTITUTE OF ELECTRICAL ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/012,020

(22) Filed: Sep. 3, 2020

Related U.S. Application Data (63) Continuation of application No. PCT/CN2020/092564, filed on May 27, 2020.

(30) Foreign Application Priority Data

May 26, 2020 (CN) .......................... 202010456932.2

(51) Int. Cl.
*H02M 3/335* (2006.01)
*H02M 3/00* (2006.01)
*H02M 1/00* (2006.01)

(52) U.S. Cl.
CPC ..... *H02M 3/33584* (2013.01); *H02M 1/0074* (2021.05); *H02M 3/01* (2021.05); *H02M 3/33592* (2013.01); *H02M 1/0058* (2021.05)

(58) Field of Classification Search
CPC ............. H02M 1/0074; H02M 1/0077; H02M 3/33569–33584; H02M 3/3392; H02M 3/01; H02M 1/0058
See application file for complete search history.

(56) References Cited

U.S. PATENT DOCUMENTS 10,581,334 B2 * 3/2020 Zong ................. H02M 3/33584
10,804,809 B1 * 10/2020 Yelaverthi ......... H02M 3/33561
(Continued)

FOREIGN PATENT DOCUMENTS

| CN | 105871243 A | 8/2016 |
|---|---|---|
| CN | 110798074 A | 2/2020 |
| CN | 111082665 A | 4/2020 |

*Primary Examiner* — Yusef A Ahmed
(74) *Attorney, Agent, or Firm* — Bayramoglu Law Offices LLC (57) ABSTRACT

This invention proposes a three-phase CLLC bidirectional DC-DC converter, which includes a high-voltage side voltage dividing capacitor module, a three-phase half-bridge series module, a three-phase half-bridge parallel module, a three-phase primary/secondary side resonant module, a three-phase isolation transformer and a low-voltage side capacitor module. The high-voltage side voltage dividing capacitor module includes three voltage dividing capacitors. The three-phase half-bridge series/parallel module includes three bridge arms connected in series/parallel. Each bridge arm includes two switches connected in series. The three-phase primary/secondary side resonant module includes a, b, c three-phase primary/secondary side resonant tank. The three-phase isolation transformer includes three single-phase transformers a, b, and c. The voltage of the high-voltage side is divided through the voltage dividing capacitors to reduce the voltage stress of the switches, and the switching loss is diminished via the high-frequency soft switching technology.

5 Claims, 7 Drawing Sheets

(56) References Cited

U.S. PATENT DOCUMENTS

| | | | | |
|---|---|---|---|---|
| 10,826,405 B1* | 11/2020 | Bala | ................ | H02M 3/33507 |
| 2009/0040800 A1 | 2/2009 | Sonnaillon et al. | | |
| 2013/0265804 A1* | 10/2013 | Fu | ..................... | H02M 3/33576 |
| | | | | 363/17 |
| 2014/0225439 A1* | 8/2014 | Mao | ..................... | H02J 7/0029 |
| | | | | 307/31 |
| 2015/0180350 A1* | 6/2015 | Huang | .............. | H02M 3/33507 |
| | | | | 307/66 |
| 2016/0197600 A1* | 7/2016 | Kuznetsov | ................ | H02J 1/16 |
| | | | | 307/106 |
| 2017/0349054 A1* | 12/2017 | Yang | ....................... | B60L 53/24 |
| 2018/0152112 A1* | 5/2018 | Torrico-Bascope | .... | H01F 27/29 |
| 2018/0198373 A1* | 7/2018 | Torrico-Bascope | .. | H02M 3/285 |
| 2018/0269795 A1* | 9/2018 | Zhou | ................... | H02M 3/33584 |
| 2019/0052177 A1* | 2/2019 | Lu | ..................... | H02M 3/33569 |
| 2019/0058408 A1* | 2/2019 | Hao | .................... | H02M 5/4585 |
| 2019/0157980 A1* | 5/2019 | Ji | .......................... | H05B 6/685 |
| 2019/0355506 A1* | 11/2019 | Fei | ..................... | H02M 3/1584 |
| 2019/0379291 A1* | 12/2019 | Xue | .................... | H02M 7/219 |
| 2019/0379292 A1* | 12/2019 | Fei | ......................... | H01F 27/24 |
| 2020/0204079 A1* | 6/2020 | Guo | .................. | H02M 3/33569 |
| 2020/0321878 A1* | 10/2020 | Zhang | ................. | H02M 7/4837 |
| 2021/0067048 A1* | 3/2021 | Zhang | ..................... | H02J 7/007 |
| 2021/0083590 A1* | 3/2021 | Lu | ........................... | H01F 27/34 |
| 2021/0091677 A1* | 3/2021 | Ye | .................... | H02M 3/33592 |
| 2021/0099097 A1* | 4/2021 | Zhang | ................. | H02M 3/335 |
| 2021/0122255 A1* | 4/2021 | Liang | ..................... | B60L 53/22 |
| 2021/0126550 A1* | 4/2021 | Yenduri | ............. | H02M 7/2173 |
| 2021/0155100 A1* | 5/2021 | Khaligh | ................. | B60L 53/62 |

\* cited by examiner

THREE-PHASE CLLC BIDIRECTIONAL DC-DC CONVERTER AND A METHOD FOR CONTROLLING THE SAME

CROSS REFERENCE TO THE RELATED APPLICATIONS

This application is the continuation application of International Application No. PCT/CN2020/092564, filed on May 27, 2020, which is based upon and claims priority to Chinese Patent Application No. 202010456932.2, filed on May 26, 2020, the entire contents of which are incorporated herein by reference.

TECHNICAL FIELD

The present invention belongs to the technical field of direct current-direct current (DC-DC) converters, and more particularly, relates to a three-phase CLLC bidirectional DC-DC converter and a method for controlling the same.

BACKGROUND

A bidirectional DC-DC converter, which is capable of changing the direction of the input and output currents without changing the input and output voltages to accomplish bidirectional energy transfer, is critical for DC voltage conversion and power control. With the rapid development of renewable energy distributed power generation systems and DC distribution network technologies, bidirectional DC-DC converters suitable for high-voltage and high-power applications have become the focus in research.

In DC distributed power networks and renewable energy DC power generation systems, the DC voltage can reach up to several kilovolts, even tens of kilovolt. Due to the low breakdown voltage of conventional power switching devices, high-voltage DC power supply systems typically adopt a modular connection in series on the high-voltage side and parallel on the low-voltage side. As the voltage continues to increase, however, the number of required modules increases, which poses severe challenges to the efficiency, reliability, and power density of the system. In order to improve the universality and comprehensive electrical performance of the DC power supply system, the bidirectional converter in the aforesaid system needs to meet numerous requirements such as high voltage ratio and high-power capability.

The multi-level technology has been widely used in converter topologies in order to meet the operating requirements of high voltage and high power. Multi-level converters can not only realize bidirectional energy transfer, but also meet the requirements of high voltage and high power as well as further reduce the voltage stress of the power switch device. As the high-voltage side voltage increases, however, the number of required power devices in the multi-level converter dramatically increases, resulting in a complicated circuit topology and problems, such as uneven capacitive voltage division and high voltage stress of the devices. This poses great challenges to the application of multi-level converters in high-voltage bidirectional DC-DC converters.

SUMMARY

The present invention provides a three-phase CLLC bidirectional DC-DC converter to solve the above-mentioned problems in the prior art, that is, to solve the problems that the existing modular structure with high-voltage side series connection and low-voltage side parallel connection has redundant modules and poor reliability, and the existing multi-level technology-based converters have complex circuit topology, uneven capacitive voltage division, and high voltage stress of the power switch device. The three-phase CLLC bidirectional DC-DC converter includes a high-voltage side voltage dividing capacitor module, a three-phase half-bridge series module, a three-phase primary side resonant module, a three-phase isolation transformer, a three-phase secondary side resonant module, a three-phase half-bridge parallel module and a low-voltage side capacitor module connected in sequence.

The high-voltage side voltage dividing capacitor module is configured to divide a high-voltage side voltage, smooth the DC bus voltage, and absorb a high pulse current of the three-phase half-bridge series module.

The three-phase half-bridge series module is configured to modulate the divided DC bus voltage into a high-frequency alternating current (AC) square wave when energy is transferred from the high-voltage side to the low-voltage side; and to rectify a high-frequency AC voltage transferred from the transformer into a DC voltage when energy is transferred from the low-voltage side to the high-voltage side.

The three-phase primary side resonant module cooperates with the three-phase secondary side resonant module to realize soft switching of a switch.

The three-phase isolation transformer is configured to realize the electrical isolation between a primary side and a secondary side and the energy transfer between the primary side and the secondary side.

The three-phase half-bridge parallel module is configured to rectify the high-frequency AC voltage transferred from the transformer into a DC voltage when energy is transferred from the high-voltage side to the low-voltage side; and to modulate a low-voltage DC bus voltage into a high-frequency AC square wave when energy is transferred from the low-voltage side to the high-voltage side.

The low-voltage side capacitor module is configured to smooth the low-voltage DC bus voltage and absorb a high pulse current of the three-phase half-bridge parallel module.

In some preferred embodiments, the high-voltage side voltage dividing capacitor module includes a voltage dividing capacitor $C_{H1}$, a voltage dividing capacitor $C_{H2}$, and a voltage dividing capacitor $C_{H3}$.

A voltage of each of the voltage dividing capacitor $C_{H1}$, the voltage dividing capacitor $C_{H2}$, and the voltage dividing capacitor $C_{H3}$ is ⅓ of the high-voltage side voltage.

In some preferred embodiments, the three-phase half-bridge series module includes a bridge arm $S_1$, a bridge arm $S_2$ and a bridge arm $S_3$ connected in series. Each of the bridge arm $S_1$, the bridge arm $S_2$ and the bridge arm $S_3$ includes two switches connected in series.

The series connection point of the two switches is used as a midpoint of the corresponding bridge arm to obtain a midpoint Ⓐ of the bridge arm $S_1$, a midpoint Ⓑ of the bridge arm $S_2$ and a midpoint Ⓒ of the bridge arm $S_3$.

In some preferred embodiments, the three-phase half-bridge parallel module includes a bridge arm $P_1$, a bridge arm $P_2$ and a bridge arm $P_3$ connected in parallel. Each of the bridge arm $P_1$, the bridge arm $P_2$ and the bridge arm $P_3$ includes two switches connected in series.

The series connection point of the two switches is used as a midpoint of the corresponding bridge arm to obtain a midpoint ⓐ of the bridge arm $P_1$, a midpoint ⓑ of the bridge arm $P_2$ and a midpoint ⓒ of the bridge arm $P_3$.

In some preferred embodiments, the three-phase primary side resonant module includes a phase-a primary side resonant tank, a phase-b primary side resonant tank, and a phase-c primary side resonant tank.

Each primary side resonant tank includes a primary side resonant capacitor $C_{rpx}$ and a primary side resonant inductor $L_{rpx}$, wherein x=a/b/c.

In some preferred embodiments, the three-phase secondary side resonant module includes a phase-a secondary side resonant tank, a phase-b secondary side resonant tank and a phase-c secondary side resonant tank.

Each secondary side resonant tank includes a secondary side resonant capacitor $C_{rsx}$ and a secondary side resonant inductor $L_{rsx}$, wherein x=a/b/c.

In some preferred embodiments, the three-phase isolation transformer includes a three-phase primary winding and a three-phase secondary winding.

The phases of the three-phase primary winding are coupled to the phases of the primary side resonant module, respectively. The phases of the three-phase secondary winding are coupled to the phases of the secondary side resonant module, respectively.

The three-phase primary winding includes a first terminal $T_{x1}$ and a second terminal $T_{x2}$, wherein x=a/b/c. A primary side resonant capacitor $C_{rpa}$ and a primary side resonant inductor $L_{rpb}$ are connected in series between $T_{a1}$ and the midpoint Ⓐ of the bridge arm $S_1$. A primary side resonant capacitor $C_{rpb}$ and a primary side resonant inductor $L_{rpb}$ are connected in series between $T_{b1}$ and the midpoint Ⓑ of the bridge arm $S_2$. A primary side resonant capacitor $C_{rpc}$ and a primary side resonant inductor $L_{rpc}$ are connected in series between $T_{c1}$ and the midpoint Ⓒ of the bridge arm $S_3$. The primary side resonant inductor $L_{rpb}$ is connected in series between $T_{a2}$ and $T_{b1}$. The primary side resonant inductor $L_{rpc}$ is connected in series between $T_{b2}$ and $T_{c1}$. The primary side resonant inductor $L_{rpa}$ is connected in series between $T_{c2}$ and $T_{a1}$.

The three-phase secondary winding includes a third terminal $T_{x3}$ and a fourth terminal $T_{x4}$, wherein x=a/b/c. A secondary side resonant capacitor $C_{rsa}$ and a secondary side resonant inductor $L_{rsa}$ are connected in series between $T_{a3}$ and the midpoint ⓐ of the bridge arm $P_1$. A secondary side resonant capacitor $C_{rsb}$ and a secondary side resonant inductor $L_{rsb}$ are connected in series between $T_{b3}$ and the midpoint ⓑ of the bridge arm $P_2$. A secondary side resonant capacitor $C_{rsc}$ and a secondary side resonant inductor $L_{rsc}$ are connected in series between $T_{c3}$ and the midpoint ⓒ of the bridge arm $P_3$. The secondary side resonant inductor $L_{rsb}$ is connected in series between Tao and $T_{b3}$. The secondary side resonant inductor $L_{rsc}$ is connected in series between $T_{b4}$ and $T_{c3}$. The secondary side resonant inductor $L_{rsa}$ is connected in series between $T_{c4}$ and $T_{a3}$.

In some preferred embodiments, the energy transfer of the DC-DC converter includes forward energy transfer and reverse energy transfer.

The forward energy transfer is defined to transfer energy from the high-voltage side to the low-voltage side.

The reverse energy transfer is defined to transfer energy from the low-voltage side to the high-voltage side.

In some preferred embodiments, the three phases of the three-phase primary side resonant module are symmetrical with the three phases of the three-phase secondary side resonant module.

In some preferred embodiments, the three-phase isolation transformer is a magnetic integrated transformer.

Another aspect of the present invention provides a method for controlling the three-phase CLLC bidirectional DC-DC converter, including:

step S10, setting the working switches according to a direction of the energy transfer; wherein if the energy transfer is the forward energy transfer, proceeding to step S20; if the energy transfer is the reverse energy transfer, proceeding to step S30;

step S20, setting two switches of each of the bridge arm $S_1$, the bridge arm $S_2$ and the bridge arm $S_3$ to be complementarily turned on in a duty cycle of 50%, and setting the driving time sequences of the bridge arm $S_1$, the bridge arm $S_2$ and the bridge arm $S_3$ to differ by 120° in sequence; setting the switches of each of the bridge arm $P_1$, the bridge arm $P_2$ and the bridge arm $P_3$ to work in a synchronous rectification mode or an uncontrolled rectification mode, and proceeding to step S40;

step S30, setting the two switches of the bridge arms $P_1$, $P_2$ and $P_3$ to be complementarily turned on in a duty cycle of 50%, and setting the driving time sequences of the bridge arms $P_1$, $P_2$ and $P_3$ to differ by 120° in sequence; setting the switches of each of the bridge arm $S_1$, the bridge arm $S_2$ and the bridge arm $S_3$ to work in a synchronous rectification mode or an uncontrolled rectification mode, and proceeding to step S50;

step S40, modulating the divided high-voltage side voltage into a high-frequency AC square wave through the bridge arms $S_1$, $S_2$ and $S_3$, respectively, and transmitting the high-frequency AC square wave to the three-phase transformer through the primary side resonant module; wherein during the switch mode switching process, the switches of each of the bridge arms $S_1$, $S_2$ and $S_3$ realize soft switching through the primary side resonant module; and rectifying a high-frequency alternating voltage on the secondary side of the three-phase transformer into a direct current through the bridge arms $P_1$, $P_2$ and $P_3$; wherein during the primary side switch mode switching process, the switches of the bridge arms $P_1$, $P_2$ and $P_3$ realize soft switching through the secondary side resonant module, and the input voltage is transferred from the high-voltage side to the low-voltage side to realize conversion from a high-voltage DC to a low-voltage DC;

step S50, modulating the low-voltage side voltage into a high-frequency AC square wave through the bridge arms $P_1$, $P_2$ and $P_3$, respectively, and transmitting the high-frequency AC square wave to the three-phase transformer through the secondary side resonant module; wherein during the switch mode switching process, the switches of the bridge arms $P_1$, $P_2$ and $P_3$ realize soft switching through the secondary side resonant module; and rectifying a high-frequency alternating voltage on the primary side of the three-phase transformer into a direct current through the bridge arm $S_1$, the bridge arm $S_2$ and the bridge arm $S_3$; wherein the rectified DC voltage is superimposed in series through the high-voltage side voltage dividing capacitor, during the secondary side switch mode switching process, the switches of the bridge arms $S_1$, $S_2$ and $S_3$ realize soft switching through the primary side resonant module, and the input voltage is transferred from the low-voltage side to the high-voltage side to realize conversion from a low-voltage DC to a high-voltage DC.

The advantages of the present invention are as follows.

(1) In the three-phase CLLC bidirectional DC-DC converter of the present invention, the input voltage is divided into three parts on the high-voltage side through voltage dividing capacitors. Each part is ⅓ of the input voltage, so that the voltage stress of the high-voltage side switch is also reduced to ⅓, and the voltage stress of the low-voltage side switch is identical to the low-voltage side voltage, which is suitable for high-voltage and high-power applications.

(2) The three-phase CLLC bidirectional DC-DC converter is provided with a primary side resonant circuit and a secondary side resonant circuit to realize the soft switching function in the wide voltage and wide load ranges while transmitting the power bidirectionally, thus diminishing the switching loss.

(3) The three-phase CLLC bidirectional DC-DC converter effectively improves the current ripple on the high-voltage side and the low-voltage side through the interleaved connection of the three-phase circuits. In this way, the filter capacitor is reduced and the power density of the converter is also improved.

(4) In the three-phase CLLC bidirectional DC-DC converter of the present invention, the high-voltage side winding and the low-voltage side winding of the three-phase isolation transformer adopt star connection or delta connection, respectively to realize the natural current sharing of the low-voltage side current and the natural voltage sharing of the high-voltage side voltage of the converter.

(5) In the three-phase CLLC bidirectional DC-DC converter of the present invention, three single-phase isolation transformers are integrated into one transformer through magnetic integration to obtain improved power density of the transformer.

BRIEF DESCRIPTION OF THE DRAWINGS

By the detailed description of the non-restrictive embodiments with reference to the drawings, other features, objectives and advantages of the present invention will be clear.

DETAILED DESCRIPTION OF THE EMBODIMENTS

The present invention will be further described in detail below with reference to the drawings and embodiments. It can be understood that the specific embodiments described herein are only used to explain the present invention, rather than to limit the present invention. In addition, it should be noted that for the convenience of description, only the parts related to the present invention are shown in the drawings.

It should be noted that the embodiments in the present invention as well as the features in the embodiments can be combined when not in conflict with each other. The present invention will be described in detail below with reference to the drawings and embodiments.

A three-phase CLLC bidirectional DC-DC converter of the present invention includes a high-voltage side voltage dividing capacitor module, a three-phase half-bridge series module, a three-phase primary side resonant module, a three-phase isolation transformer, a three-phase secondary side resonant module, a three-phase half-bridge parallel module and a low-voltage side capacitor module connected in sequence.

The high-voltage side voltage dividing capacitor module is configured to divide high-voltage side voltage, smooth DC bus voltage, and absorb high pulse current of the three-phase half-bridge series module.

The three-phase half-bridge series module is configured to modulate the divided DC bus voltage into a high-frequency AC square wave when energy is transferred from the high-voltage side to the low-voltage side, and to rectify a high-frequency AC voltage transferred from the transformer into a DC voltage when energy is transferred from the low-voltage side to the high-voltage side.

The three-phase primary side resonant module cooperates with the three-phase secondary side resonant module to realize soft switching of the switch.

The three-phase isolation transformer is configured to realize the electrical isolation between a primary side and a secondary side and the energy transfer between the primary side and the secondary side.

The three-phase half-bridge parallel module is configured to rectify the high-frequency AC voltage transferred from the transformer into a DC voltage when energy is transferred from the high-voltage side to the low-voltage side, and to modulate the low-voltage DC bus voltage into a high-frequency AC square wave when energy is transferred from the low-voltage side to the high-voltage side.

The low-voltage side capacitor module is configured to smooth a low-voltage DC bus voltage and absorb a high pulse current of the three-phase half-bridge parallel module.

Figure 1:
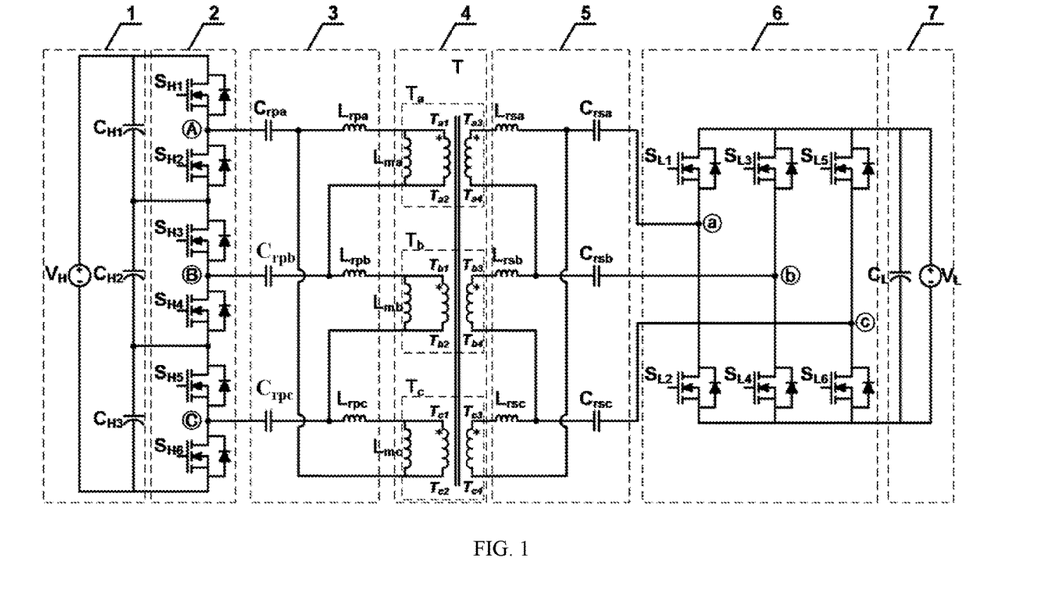
FIG. 1 is a schematic diagram of the structure of the three-phase CLLC bidirectional DC-DC converter of the present invention.

In order to more clearly describe the three-phase CLLC bidirectional DC-DC converter of the present invention, each module in the embodiment of the present invention will be described in detail with reference to FIG. 1.

A three-phase CLLC bidirectional DC-DC converter according to an embodiment of the present invention includes the high-voltage side voltage dividing capacitor module 1, the three-phase half-bridge series module 2, the three-phase primary side resonant module 3, the three-phase isolation transformer 4, the three-phase secondary side resonant module 5, the three-phase half-bridge parallel module 6 and the low-voltage side capacitor module 7. Each module is described in detail as follows.

The energy transfer of the three-phase CLLC bidirectional DC-DC converter includes forward energy transfer and reverse energy transfer.

The forward energy transfer is defined to transfer energy from the high-voltage side to the low-voltage side. For example, the voltage $V_H$ input to the high-voltage side, after being transferred to the low-voltage side to load on the low-voltage side load, is converted into the voltage $V_L$. The reverse energy transfer is defined to transfer energy from the low-voltage side to the high-voltage side. For example, the voltage $V_L$ input to the low-voltage side, after being transferred to the high-voltage side to load on the high-voltage side load, is converted into the voltage $V_H$.

The high-voltage side voltage dividing capacitor module 1 includes the voltage dividing capacitor $C_{H1}$, the voltage dividing capacitor $C_{H2}$ and the voltage dividing capacitor $C_{H3}$. The voltage of each of the voltage dividing capacitor $C_{H1}$, the voltage dividing capacitor $C_{H2}$ and the voltage dividing capacitor $C_{H3}$ is ⅓ of the high-voltage side voltage $V_H$, i.e., $V_H/3$. Due to the large capacitance of the voltage dividing capacitor, each voltage dividing capacitor can also be regarded as a voltage source with a voltage of $V_H/3$ within the switching period.

The low-voltage side capacitor module 7 is marked as $V_L$, and can also be regarded as a voltage source with a voltage of $V_L$.

The three-phase half-bridge series module 2 includes the bridge arms $S_1$, $S_2$ and $S_3$ connected in series. Each bridge arm includes two switches connected in series. The bridge arm $S_1$ includes the switches $S_{H1}$ and $S_{H2}$. The bridge arm $S_2$ includes the switches $S_{H3}$ and $S_{H4}$. The bridge arm $S_3$ includes the switches $S_{H5}$ and $S_{H6}$.

The connection point of the switches $S_{H1}$ and $S_{H2}$ is the midpoint Ⓐ of the bridge arm $S_1$. Similarly, the connection point of the switches $S_{H3}$ and $S_{H4}$ is the midpoint Ⓑ of the bridge arm $S_2$, and the connection point of the switches $S_{H5}$ and $S_{H6}$ is the midpoint Ⓒ of the bridge arm $S_3$.

The three-phase half-bridge parallel module 6 includes the bridge arms $P_1$, $P_2$ and $P_3$ connected in parallel. Each bridge arm includes two switches connected in series. The bridge arm $P_1$ includes the switches $S_{L1}$ and $S_{L2}$. The bridge arm $P_2$ includes the switches $S_{L3}$ and $S_{L4}$. The bridge arm $P_3$ includes the switches $S_{L5}$ and $S_{L6}$.

The connection point of the switches $S_{L1}$ and $S_{L2}$ is the midpoint ⓐ of the bridge arm $P_1$. Similarly, the connection point of the switches $S_{L3}$ and $S_{L4}$ is the midpoint ⓑ of the bridge arm $P_2$, and the connection point of the switches $S_{L5}$ and $S_{L6}$ is the midpoint ⓒ of the bridge arm $P_3$.

The three-phase primary side resonant module 3 includes a phase-a primary side resonant tank, a phase-b primary side resonant tank and a phase-c primary side resonant tank.

The phase-a primary side resonant tank includes the primary side resonant capacitor $C_{rpa}$, the primary side resonant inductor $L_{rpa}$ and the magnetizing inductor $L_{ma}$. The phase-b primary side resonant tank includes the primary side resonant capacitor $C_{rpb}$, the primary side resonant inductor $L_{rpb}$ and the magnetizing inductor $L_{mb}$. The phase-c primary side resonant tank includes the primary side resonant capacitor $C_{rpc}$, the primary side resonant inductor $L_{rpc}$ and the magnetizing inductor $L_{mc}$.

The three-phase secondary side resonant module 5 includes a phase-a secondary side resonant tank, a phase-b secondary side resonant tank and a phase-c secondary side resonant tank.

The phase-a secondary side resonant tank includes the secondary side resonant capacitor $C_{rsa}$ and the secondary side resonant inductor $L_{rsa}$. The phase-b secondary side resonant tank includes the secondary side resonant capacitor $C_{rsb}$ and the secondary side resonant inductor $L_{rsb}$. The phase-c secondary side resonant tank includes the secondary side resonant capacitor $C_{rsc}$ and the secondary side resonant inductor $L_{rsc}$.

The three-phase isolation transformer 4 includes the phase-a isolation transformer $T_a$, the phase-b isolation transformer $T_b$ and the phase-c isolation transformer $T_c$. The primary winding and the secondary winding of the three-phase isolation transformer are both delta connected.

The primary winding of the three-phase isolation transformer 4 is composed of the primary windings of the phase-a isolation transformer $T_a$, the phase-b isolation transformer $T_b$ and the phase-c isolation transformer $T_c$. Each primary winding includes the first terminal $T_{x1}$ and the second terminal $T_{x2}$. Similarly, the secondary winding of the three-phase isolation transformer 4 is composed of the secondary windings of the phase-a isolation transformer $T_a$, the phase-b isolation transformer $T_b$, and the phase-c isolation transformer $T_c$. Each secondary winding includes the third terminal $T_{x3}$ and the fourth terminal $T_{x4}$, wherein x=a/b/c.

The primary side resonant capacitor $C_{rpa}$ and the primary side resonant inductor $L_{rpa}$ are connected in series between $T_{a1}$ and the midpoint Ⓐ of the bridge arm $S_1$. The primary side resonant capacitor $C_{rpb}$ and the primary side resonant inductor $L_{rpb}$ are connected in series between $T_{b1}$ and the midpoint Ⓑ of the bridge arm $S_2$. The primary side resonant capacitor $C_{rpc}$ and the primary side resonant inductor $L_{rpc}$ are connected in series between $T_{c1}$ and the midpoint Ⓒ of the bridge arm $S_3$. The primary side resonant inductor $L_{rpb}$ is connected in series between $T_{a2}$ and $T_{b1}$. The primary side resonant inductor $L_{rpc}$ is connected in series between $T_{b2}$ and $T_{c1}$. The primary side resonant inductor $L_{rpa}$ is connected in series between $T_{c2}$ and $T_{a1}$.

The secondary side resonant capacitor $C_{rsa}$ and the secondary side resonant inductor $L_{rsa}$ are connected in series between $T_{a3}$ and the midpoint ⓐ of the bridge arm $P_1$. The secondary side resonant capacitor $C_{rsb}$ and the secondary side resonant inductor $L_{rsb}$ are connected in series between $T_{b3}$ and the midpoint ⓑ of the bridge arm $P_2$. The secondary side resonant capacitor $C_{rsc}$ and the secondary side resonant inductor $L_{rsc}$ are connected in series between $T_{c3}$ and the midpoint ⓒ of the bridge arm $P_3$. The secondary side resonant inductor $L_{rsb}$ is connected in series between Tao and $T_{b3}$. The secondary side resonant inductor $L_{rsc}$ is connected in series between $T_{b4}$ and $T_{c3}$. The secondary side resonant inductor $L_{rsa}$ is connected in series between $T_{c4}$ and $T_{a3}$.

According to the above connection relationships, the first phase CLLC bidirectional DC-DC conversion module, phase-a, includes: the primary side bridge arm $S_1$, the primary side resonant inductor $L_{rpa}$, the primary side resonant capacitor $C_{rpa}$, the magnetizing inductor $L_{ma}$, the transformer $T_a$, the secondary side resonant capacitor $C_{rsa}$, the secondary side resonant inductor $L_{rsa}$ and the secondary side bridge arm $P_1$. The second phase CLLC bidirectional DC-DC conversion module, phase-b, includes: the primary side bridge arm $S_2$, the primary side resonant inductor $L_{rpb}$, the primary side resonant capacitor $C_{rpb}$, the magnetizing inductor $L_{mb}$, the transformer $T_b$, the secondary side resonant capacitor $C_{rsb}$, the secondary side resonant inductor $L_{rsb}$ and the secondary side bridge arm $P_2$. The third phase CLLC bidirectional DC-DC conversion module, phase-c, includes: the primary side bridge arm $S_3$, the primary side resonant inductor $L_{rpc}$, the primary side resonant capacitor $C_{rpc}$, the magnetizing inductor $L_{mc}$, the transformer $T_c$, the secondary side resonant capacitor $C_{rsc}$, the secondary side resonant inductor $L_{rsc}$ and the secondary side bridge arm $P_3$.

Figure 2:
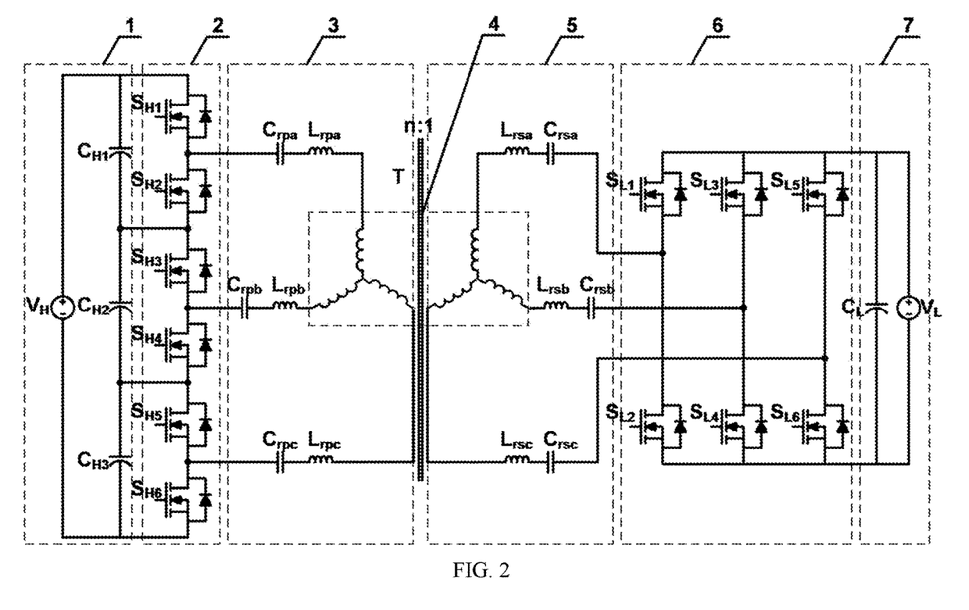
FIG. 2 is a schematic diagram of the structure of the three-phase CLLC bidirectional DC-DC converter with primary side star connection method and secondary side star connection method according to an embodiment of the three-phase CLLC bidirectional DC-DC converter of the present invention.

In the present invention, the three-phase CLLC bidirectional DC-DC converter with different topological structures can be constructed according to the different connection methods of the primary and secondary windings of the three-phase transformer. FIG. 2 schematically shows the structure of the three-phase CLLC bidirectional DC-DC converter with primary side star connection method and secondary side star connection method according to an embodiment of the three-phase CLLC bidirectional DC-DC converter of the present invention. In other embodiments, the connection methods of the primary and secondary windings of the three-phase transformer can also be adjusted as needed, which are not be described in detail herein.

The second embodiment of the present invention provides a method for controlling the three-phase CLLC bidirectional DC-DC converter. The method includes:

Step S10: The switches are set according to a direction of the energy transfer. If the energy transfer is the forward energy transfer, proceeding to step S20. If the energy transfer is the reverse direction, proceeding to step S30.

Step S20: Two switches of the bridge arms $S_1$, $S_2$ and $S_3$ are set to be complementarily turned on in a duty cycle of 50%. The driving time sequences of the bridge arms $S_1$, $S_2$ and $S_3$ are set to differ by 120° in sequence. The switches of the bridge arms $P_1$, $P_2$ and $P_3$ are set to work in a synchronous rectification mode or an uncontrolled rectification mode, and proceeding to step S40.

Step S30: The two switches of the bridge arms $P_1$, $P_2$ and $P_3$ are set to be complementarily turned on in a duty cycle of 50%. The driving time sequences of the bridge arms $P_1$, $P_2$ and $P_3$ are set to differ by 120° in sequence. The switches of the bridge arms $S_1$, $S_2$ and $S_3$ are set to work in a synchronous rectification mode or an uncontrolled rectification mode, and proceeding to step S50.

Step S40: The divided high-voltage side voltage is modulated into a high-frequency AC square wave through the bridge arms $S_1$, $S_2$, and $S_3$, respectively, and the high-frequency AC square wave is transmitted to the three-phase transformer through the primary side resonant module. During the switch mode switching process, the switches of each of the bridge arms $S_1$, $S_2$ and $S_3$ realize soft switching through the primary side resonant module. The high-frequency alternating voltage on the secondary side of the three-phase transformer is rectified into a direct current through the bridge arms $P_1$, $P_2$ and $P_3$. During the primary side switch mode switching process, the switches of each of the bridge arms $P_1$, $P_2$ and $P_3$ realize soft switching through the secondary side resonant module, and the input voltage is transferred from the high-voltage side to the low-voltage side to realize conversion from a high-voltage DC to a low-voltage DC.

Step S50: The low-voltage side voltage is modulated into a high-frequency AC square wave through the bridge arms $P_1$, $P_2$ and $P_3$, respectively, and the high-frequency AC square wave is transmitted to the three-phase transformer through the secondary side resonant module. During the switch mode switching process, the switches of the bridge arms $P_1$, $P_2$ and $P_3$ realize soft switching through the secondary side resonant module. The high-frequency alternating voltage on the primary side of the three-phase transformer is rectified into a direct current through the bridge arms $S_1$, $S_2$ and $S_3$. The rectified DC voltage is superimposed in series through the high-voltage side voltage dividing capacitor. During the secondary side switch mode switching process, the switches of the bridge arms $S_1$, $S_2$ and $S_3$ realize soft switching through the primary side resonant module, and the input voltage is transferred from the low-voltage side to the high-voltage side to realize conversion from a low-voltage DC to a high-voltage DC.

Figure 3:
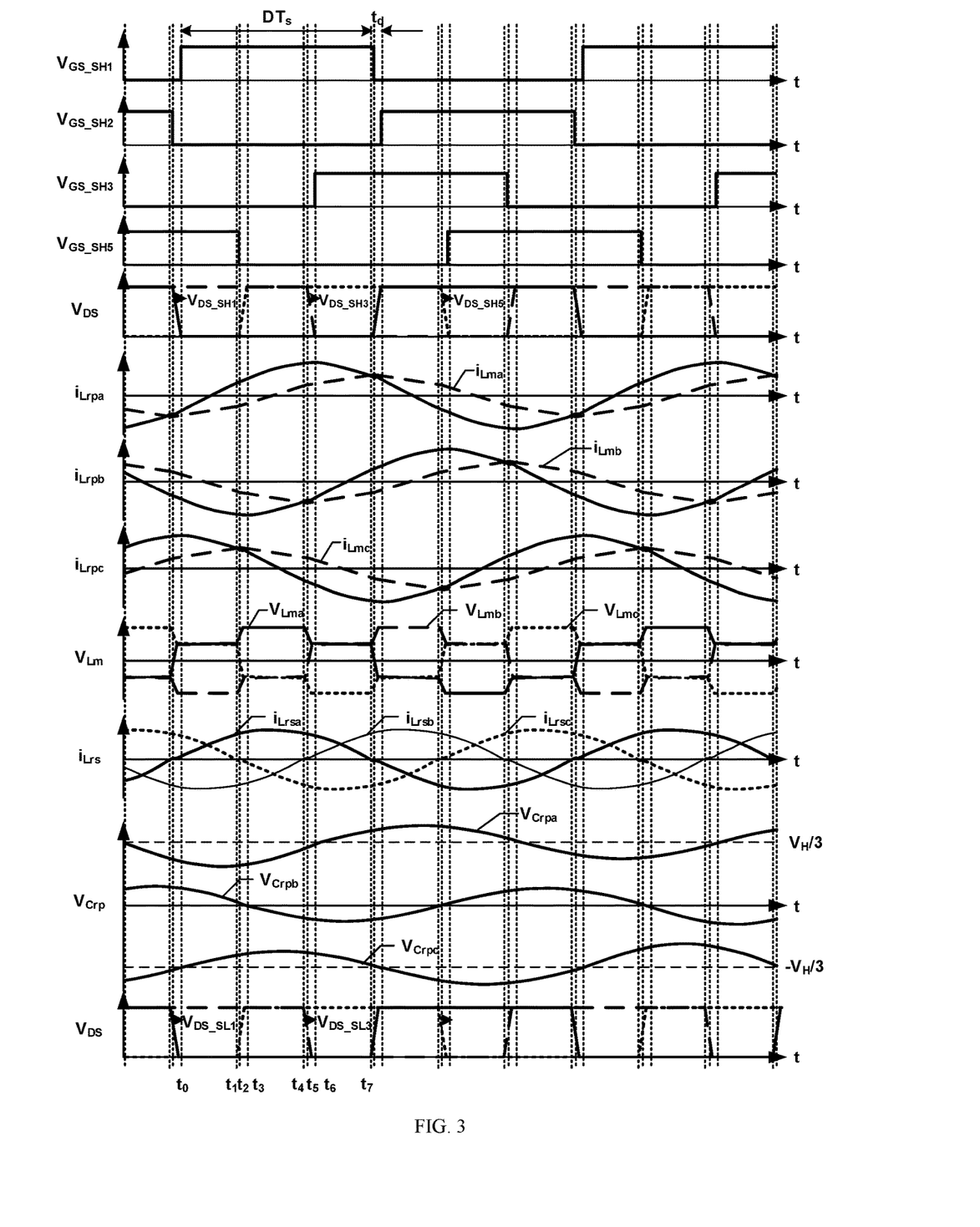
FIG. 3 is a waveform diagram of main working parameters according to an embodiment of the three-phase CLLC bidirectional DC-DC converter of the present invention during forward energy transfer.
Figure 4:
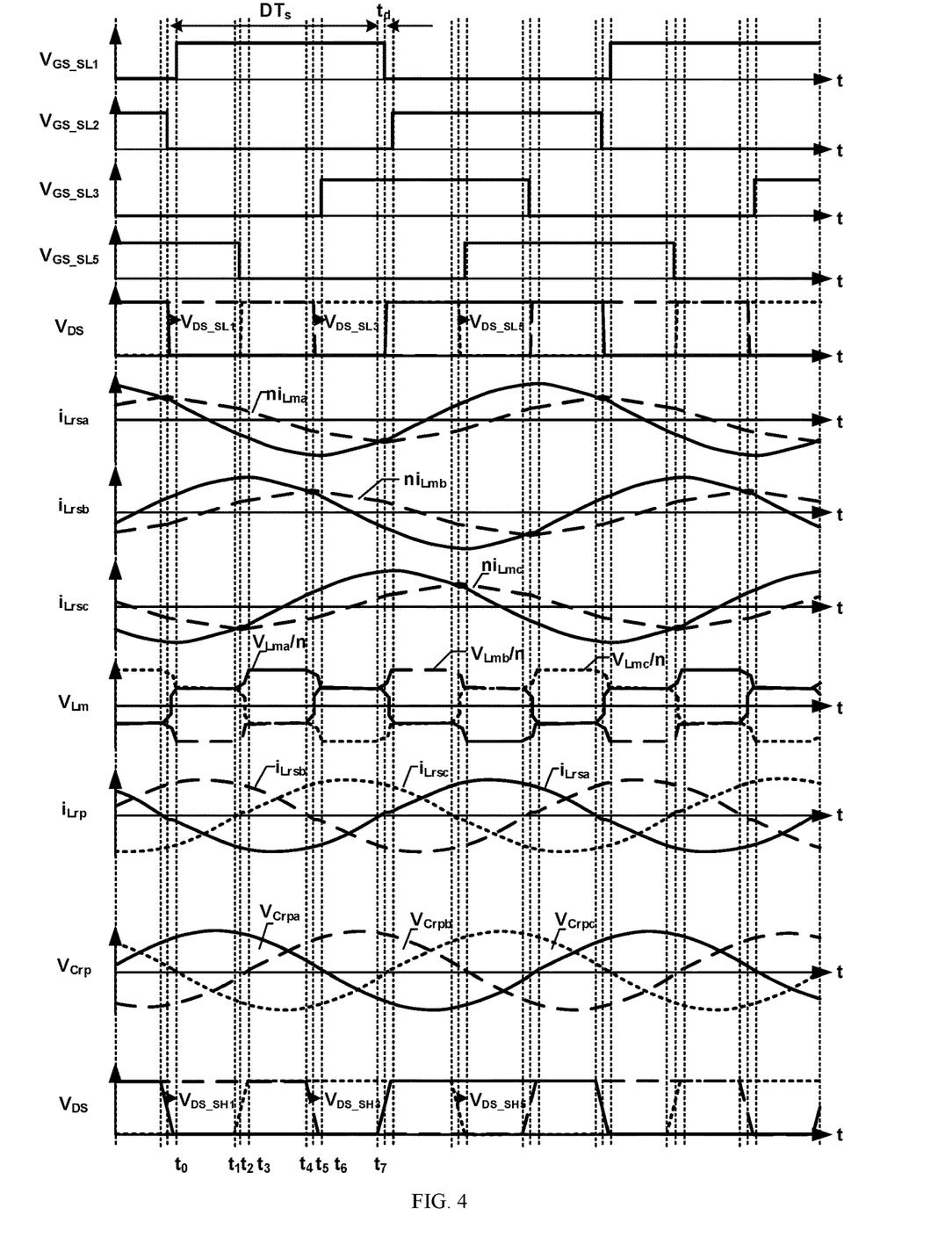
FIG. 4 is a waveform diagram of main working parameters according to an embodiment of the three-phase CLLC bidirectional DC-DC converter of the present invention during reverse energy transfer.

FIG. 3 is a waveform diagram of main working parameters according to an embodiment of the three-phase CLLC bidirectional DC-DC converter of the present invention during forward energy transfer; and FIG. 4 is a waveform diagram of main working parameters according to an embodiment of the three-phase CLLC bidirectional DC-DC converter of the present invention during reverse energy transfer. Combined with FIG. 1, according to the magnitude relationship between the switching frequency $f_s$ and the resonant frequency $f_r$, the working modes of the converter are divided into three modes: the first mode, $f_s > f_r$; the second mode, $f_s = f_r$; and the third mode, $f_s < f_r$.

The first mode is taken as an example. In a complete cycle, the working condition of the converter in the first half cycle is similar to that in the second half cycle. The first half cycle is taken as an example herein to analyze the circuit, wherein $V_H$ represents the high-voltage side voltage; $V_L$ represents the low-voltage side voltage; $i_{Lrpb}$, and $i_{Lrpc}$ represent the primary side resonant current of phase-a, the primary side resonant current of phase-b and the primary side resonant current of phase-c of the three-phase isolation transformer, respectively; $i_{Lrsa}$, $i_{Lrsb}$, and $i_{Lrsc}$ represent the secondary side resonant current of phase-a, the secondary side resonant current of phase-b, and the secondary side resonant current of phase-c of the three-phase isolation transformer, respectively; $i_{Lma}$, $i_{Lmb}$, and $i_{Lmc}$ represent the magnetizing current of phase-a, the magnetizing current of phase-b, and the magnetizing current of phase-c of the three-phase isolation transformer, respectively; $V_{Lma}$, $V_{Lmb}$, and $V_{Lmc}$ represent the magnetizing voltage of phase-a, the magnetizing voltage of phase-b, and the magnetizing voltage of phase-c of the three-phase isolation transformer, respectively; and $V_{Crpa}$, $V_{Crpb}$, and $V_{Crpc}$ represent the voltage of the primary side resonant capacitor of phase-a, the voltage of the primary side resonant capacitor of phase-b, and the voltage of the primary side resonant capacitor of phase-c, respectively.

In order to simplify the analysis, the following assumptions are made:

(1) All the switches are ideal devices.

(2) All the inductors and capacitors are ideal devices.

(3) The capacitors of the high-voltage side and the low-voltage side have an enough large capacitance and thus can be regarded as voltage sources in one switching cycle.

(4) The magnetizing inductance $L_{ma} = L_{mb} = L_{mc} = L_m$, the primary side resonant inductance $L_{rpa} = L_{rpb} = L_{rpc} = L_{rp}$, the primary side resonant capacitance $C_{rpa} = C_{rpb} = C_{rpc} = C_{rp}$, the secondary side resonant inductance $L_{rsa} = L_{rsb} = L_{rsc} = L_{rs}$, and the secondary side resonant capacitance $C_{rsa} = C_{rsb} = C_{rsc} = C_{rs}$.

The first resonant frequency is defined as $f_{r1}$ and the second resonant frequency is defined as $f_{r2}$, as shown in formulas (1) and (2):

$$f_{r1} = \frac{1}{2\pi\sqrt{(L_m + L_{rp})C_{rp}}}, \quad \text{formula (1)}$$

$$f_{r2} = \frac{1}{2\pi\sqrt{L_{rp}C_{rp}}} = \frac{1}{2\pi\sqrt{L_{rs}C_{rs}}}. \qquad \text{formula (2)}$$

During forward energy transfer, the specific working principle of the converter is analyzed as follows.

Working Mode I [$t_0$-$t_1$]:

Before to, $S_{H1}$, $S_{H2}$, $S_{H3}$ and $S_{H6}$ are turned off, and $S_{H4}$ and $S_{H5}$ are turned on. This period is in the dead time of the phase-a circuit. Within the dead time, the parasitic capacitors of the primary side switches $S_{H1}$ and $S_{H2}$ are charged and discharged through the primary side resonant current $i_{Lpa}$ of phase-a. The drain-source voltage of $S_{H2}$ resonates to 0 to achieve soft turn-off, and the drain-source voltage of $S_{H1}$ resonates to the bridge arm bus voltage $V_H/3$ to reach the soft turn-on condition. Because of participating in this resonance process, the current $i_{Lma}$ of $L_{ma}$ first resonates to drop and then to rise in the reverse direction.

Meanwhile, before to, after the secondary side current of phase-a resonates to 0, the phase-a is equivalent to the resonance between $L_{rpa}$ and $L_{rsa}$ connected in series and the parasitic capacitors of $S_{L1}$ and $S_{L2}$, and the resonant current $i_{Lrsa}$ allows $S_{L1}$ and $S_{L2}$ to realize soft switching. Then, $S_{L1}$ is turned on and $S_{L2}$ is turned off. This action also changes the voltages applied to $L_{ma}$, $L_{mb}$, and $L_{mc}$, specifically: $V_{Lma}$ changes from $-nV_L/3$ to $nV_L/3$, $V_{Lmb}$ changes from $-nV_L/3$ to $-nV_L \times 2/3$, and $V_{Lmc}$ changes from $nV_L \times 2/3$ to $nV_L/3$.

At to, a turn-on signal is applied on the gate of $S_{H1}$, so that $S_{H1}$ realizes soft turn-on. After to, due to the resonance of $L_{rpa}$ and $C_{rpa}$, $i_{Lrpa}$ first resonates to 0, and then continues to resonate to rise in the reverse direction. $V_L$ clamps the voltage on the magnetizing inductor, so that $i_{Lma}$ and $i_{Lmc}$ increase linearly, and $i_{Lmb}$ continues to decrease linearly.

Working Mode II [$t_1$-$t_2$]:

At $t_1$, the secondary side current of phase-c drops to 0 due to the resonance of $L_{rsc}$ and $C_{rsc}$. Therefore, the primary side resonant current $i_{Lrpc}$ of phase-c is equal to the magnetizing current $i_{Lmc}$ of phase-c at $t_1$. The phase-c is equivalent to the resonance between $L_{rpc}$, $L_{mc}$, $L_{rsc}$ and the parasitic capacitors of $S_{L5}$ and $S_{L6}$, wherein $L_{rpc}$ and $L_{mc}$ are first connected in parallel and then connected in series with $L_{rsc}$. The resonant current $i_{Lrsc}$ allows $S_{L5}$ and $S_{L6}$ to realize soft switching. Then, $S_{L5}$ is turned off, $S_{L6}$ is turned on, $L_{rsc}$ and $C_{rsc}$ are connected in series and continue to resonate. Meanwhile, since the magnetizing inductors $L_{ma}$, $L_{mb}$, and $L_{mc}$ also participate in resonance, the voltage of each magnetizing inductor is changed, specifically: $V_{Lma}$ and $V_{Lmb}$ resonate to rise, and $V_{Lmc}$ resonates to drop during the resonance process.

Working Mode III [$t_2$-$t_3$]:

At $t_2$, $S_{H5}$ is turned off. This period is the dead time of the phase-c circuit. Since $L_{mc} \gg L_{rpc}$ and $L_{mc} \gg L_{rsc}$, the phase-c circuit is equivalent to the resonance between $L_{rpc}$, $L_{rsc}$, $L_{mc}$ and the parasitic capacitors of $S_{H5}$ and $S_{H6}$, wherein $L_{rsc}$ and $L_{mc}$ are first connected in parallel and then connected in series with $L_{rpc}$. The resonant current $i_{Lrpc}$ allows the drain-source voltage of $S_{H5}$ to rise from 0 to $V_H/3$, and allows the drain-source voltage of $S_{H6}$ to drop from $V_H/3$ to 0. $S_{H5}$ realizes soft turn-off, and the backward diode of $S_{H6}$ is turned on. Due to the resonance, $V_{Lma}$ and $V_{Lmb}$ resonate to rise, and $V_{Lmc}$ resonates to drop.

After $S_{H5}$ reaches soft turn-off, the resonance process between $L_{rpc}$, $L_{rsc}$, $L_{mc}$ and the parasitic capacitors of $S_{H5}$ and $S_{H6}$ ends. The voltages applied to $L_{ma}$, $L_{mb}$ and $L_{mc}$ are changed, specifically: $V_{Lma}$ changes from $nV_L/3$ in the working mode II to $nV_L \times 2/3$, $V_{Lmb}$ changes from $-nV_L \times 2/3$ to $-nV_L/3$, and $V_{Lmc}$ changes from $nV_L/3$ to $-nV_L/3$. Therefore, $i_{Lmc}$ starts to decrease linearly after the resonance is completed.

Working Mode IV [$t_3$-$t_4$]:

At $t_3$, a turn-on signal is applied on the gate of $S_{H6}$, and $S_{H6}$ realizes soft turn-on due to the freewheeling effect of the diode. After $t_3$, the primary side and secondary side resonant units of the a, b, and phase-c circuits continue to resonate, and the magnetizing inductors do not participate in resonance due to the clamping of the secondary side switch circuit, so that the magnetizing currents change linearly.

Working Mode V [$t_4$-$t_5$]:

At $t_4$, the secondary side current of phase-b drops to 0 due to the resonance of $L_{rsb}$ and $C_{rsb}$. Therefore, the primary side resonant current $i_{Lrpb}$ of phase-b is equal to the magnetizing current $i_{Lmb}$ of phase-b at $t_4$. The phase-b is equivalent to the resonance between $L_{rpb}$, $L_{mb}$, $L_{rsb}$ and the parasitic capacitors of $S_{L3}$ and $S_{L4}$, wherein $L_{rpb}$ and $L_{mb}$ are first connected in parallel and then connected in series with $L_{rsb}$. The resonant current $i_{Lrsb}$ allows $S_{L3}$ and $S_{L4}$ to realize soft switching. Then, $S_{L3}$ is turned off, $S_{L4}$ is turned on, and $L_{rsb}$ and $C_{rsb}$ are connected in series and continue to resonate.

Working Mode VI [$t_5$-$t_6$]:

At $t_5$, $S_{H3}$ is turned off. This period is the dead time of the phase-b circuit. Since $L_{mb} \gg L_{rpb}$ and $L_{mb} \gg L_{rsb}$, the phase-b circuit is equivalent to the resonance between $L_{rpb}$, $L_{rsb}$, $L_{mb}$ and the parasitic capacitors of $S_{H3}$ and $S_{H4}$, wherein $L_{rsb}$ and $L_{mb}$ are first connected in parallel and then connected in series with $L_{rpb}$. The resonant current $i_{Lrpb}$ allows the drain-source voltage of $S_{H4}$ to rise from 0 to $V_H/3$, and allows the drain-source voltage of $S_{H3}$ to drop from $V_H/3$ to 0. $S_{H4}$ realizes soft turn-off, and the backward diode of $S_{H3}$ is turned on. Due to the resonance, $V_{Lma}$ and $V_{Lmc}$ resonate to drop, and $V_{Lmb}$ resonates to rise.

After $S_{H3}$ reaches soft turn-off, the resonance process between $L_{rpb}$, $L_{rsb}$, $L_{mb}$ and the parasitic capacitors of $S_{H3}$ and $S_{H4}$ ends. The voltages applied to $L_{ma}$, $L_{mb}$ and $L_{mc}$ changes, specifically: $V_{Lma}$ changes from $nV_L \times 2/3$ in the working mode IV to $nV_L \times 3$, $V_{Lmb}$ changes from $-nV_L/3$ to $nV_L/3$, and $V_{Lmc}$ changes from $-nV_L/3$ to $-nV_L \times 2/3$. Therefore, $i_{Lmb}$ starts to decrease linearly after the resonance is completed.

At $t_6$, $S_{H4}$ is turned on and the dead time of the phase-b circuit ends.

Working Mode VII [$t_6$-$t_7$]:

At $t_6$, a turn-on signal is applied on the gate of $S_{H3}$, and $S_{H3}$ realizes soft turn-on due to the freewheeling effect of the diode. After $t_6$, same as the working mode IV, the primary side and secondary side resonant units of a, b, and phase-c circuits continue to resonate, and the magnetizing currents change linearly.

Working Mode VIII [$t_7$-$t_8$]

At $t_7$, the secondary side current of phase-a drops to 0 due to the resonance of $L_{rsa}$ and $C_{rsa}$. Therefore, the primary side resonant current $i_{Lrpa}$ of phase-a is equal to the magnetizing current $i_{Lma}$ of phase-a at $t_7$. The phase-a is equivalent to the resonance between $L_{rpa}$, $L_{ma}$, $L_{rsa}$ and the parasitic capacitors of $S_{L1}$ and $S_{L2}$, wherein $L_{rpa}$ and $L_{ma}$ are first connected in parallel and then connected in series with $L_{rsa}$. The resonant current $i_{Lrsa}$ allows $S_{L1}$ and $S_{L2}$ to realize soft switching. Then, $S_{L1}$ is turned off, $S_{L2}$ is turned on, and $L_{rsa}$ and $C_{rsa}$ are connected in series and continue to resonate. FIG. 2 shows the equivalent circuit of the working mode VIII.

After $t_8$, $S_{H1}$ is turned off, the circuit starts to enter the dead time of the phase-a circuit, the converter enters the second half cycle, and the working process thereof is similar to that of the first half cycle described above.

During reverse energy transfer, the analysis of the specific working principle of the converter is similar to that of the above-mentioned forward energy transfer, and thus will not be described in detail herein.

The above analysis of the working process shows that the zero-voltage switching (ZVS) of the switch can be realized through the resonance of the resonant inductor and the parasitic capacitor of the switch. In addition, due to the resonance between the resonant inductor and the series resonant capacitor, the current when the switch is turned off is small, so that the ZVS turn-off of the switch can be approximately achieved.

During forward energy transfer, the three-phase half-bridge parallel unit works in a diode rectification mode or a synchronous rectification mode. During reverse energy transfer, the three-phase half-bridge series unit works in a diode rectification mode or a synchronous rectification mode. Due to the resonance of the resonant inductor and the parasitic capacitors of the switch, the soft switching of the diode or synchronous rectifier can be realized, thus diminishing the switching loss and improving the efficiency of the converter.

Figure 5:
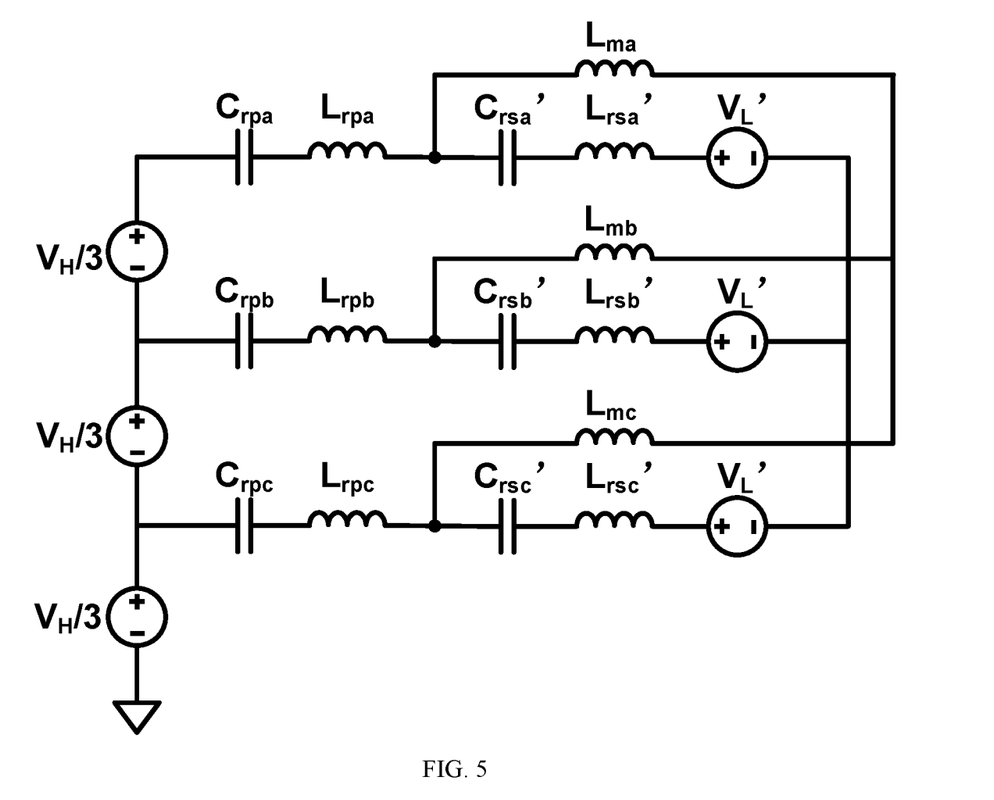
FIG. 5 shows an equivalent circuit model of an embodiment of the three-phase CLLC bidirectional DC-DC converter of the present invention.
Figure 6:
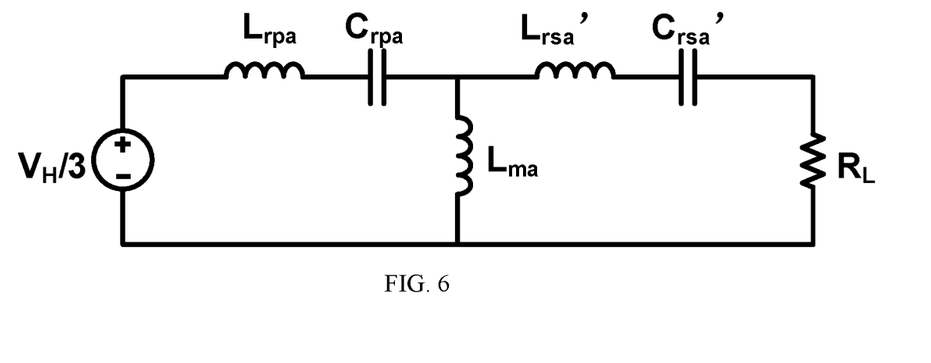
FIG. 6 shows an equivalent circuit model of the phase-a circuit according to an embodiment of the three-phase CLLC bidirectional DC-DC converter of the present invention.

High-voltage gain is one of the important characteristics of the three-phase CLLC bidirectional DC-DC converter. In an embodiment of the present invention, the fundamental wave equivalent method is adopted, assuming that the converter is only related to the fundamental wave component when transferring energy through the resonant network, so that the converter is equivalent to a linear circuit for analysis. FIG. 5 shows an equivalent circuit model of an embodiment of the three-phase CLLC bidirectional DC-DC converter of the present invention, that is, FIG. 5 shows a fundamental wave equivalent conversion circuit of FIG. 1. The phase-a circuit is taken as an example for analysis. FIG. 6 shows an equivalent circuit model of the phase-a circuit according to an embodiment of the three-phase CLLC bidirectional DC-DC converter of the present invention. Assuming that energy is transferred from the high-voltage side to the low-voltage side, and the transformation ratio of the transformer is n. The equivalent inductance of the secondary side resonant inductor converted to the primary side is $L_{rsa}' = L_{rsa}/n^2$. The equivalent capacitance of the secondary side resonant capacitor converted to the primary side is $C_{rsa}' = C_{rsa} \times n^2$. The equivalent load converted to the primary side is $R_{eqa} = 24n^2 R_L/\pi^2$, wherein $R_L$ represents the load on the low-voltage side. Then, the normalized frequency, the characteristic impedance of the primary side, the quality factor of the primary side, the ratio of the magnetizing inductance to the resonant inductance, and the ratio of the leakage inductance of the primary side to the leakage inductance of the secondary side are separately expressed by formula (3), formula (4), formula (5), formula (6) and formula (7):

$$f_n = \frac{f_s}{f_{r1}}, \quad \text{formula (3)}$$

$$Z_{rpa} = \sqrt{\frac{L_{rpa}}{C_{rpa}}}, \quad \text{formula (4)}$$

$$Q = \frac{Z_{rpa}}{R_{eqa}}, \quad \text{formula (5)}$$

$$k = \frac{L_{ma}}{L_{rpa}}, \quad \text{formula (6)}$$

$$m = \frac{L_{rpa}}{L_{rsa'}}. \quad \text{formula (7)}$$

Accordingly, by the fundamental wave analysis method, the voltage gain is obtained, as shown in formula (8):

$$M_A = \frac{1}{\sqrt{\left(\frac{Q}{k}\right)^2 \left(af_n - \frac{b}{f_n} + \frac{1}{mf_n^3}\right)^2 + \left(1 + \frac{1}{k} - \frac{1}{kf_n^2}\right)^2}}, \quad \text{formula (8)}$$

wherein, a=2k+1 and $$b = \frac{(k+1)(m+1)}{m}.$$

Figure 7:
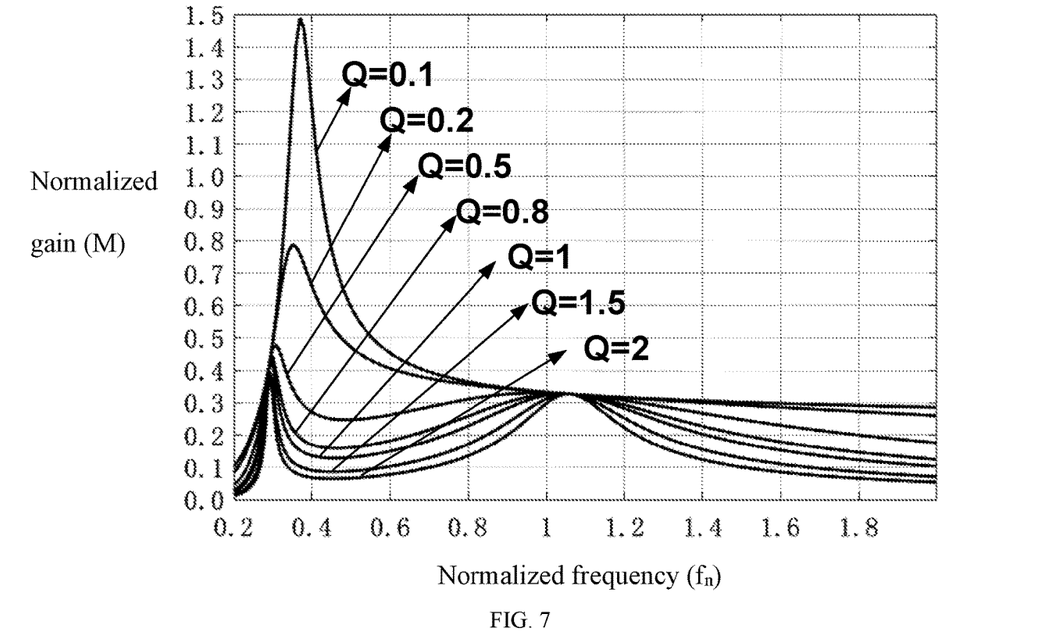
FIG. 7 shows gain curves under different Q values when k=6 and m=0.8 according to an embodiment of the three-phase CLLC bidirectional DC-DC converter of the present invention.
Figure 8:
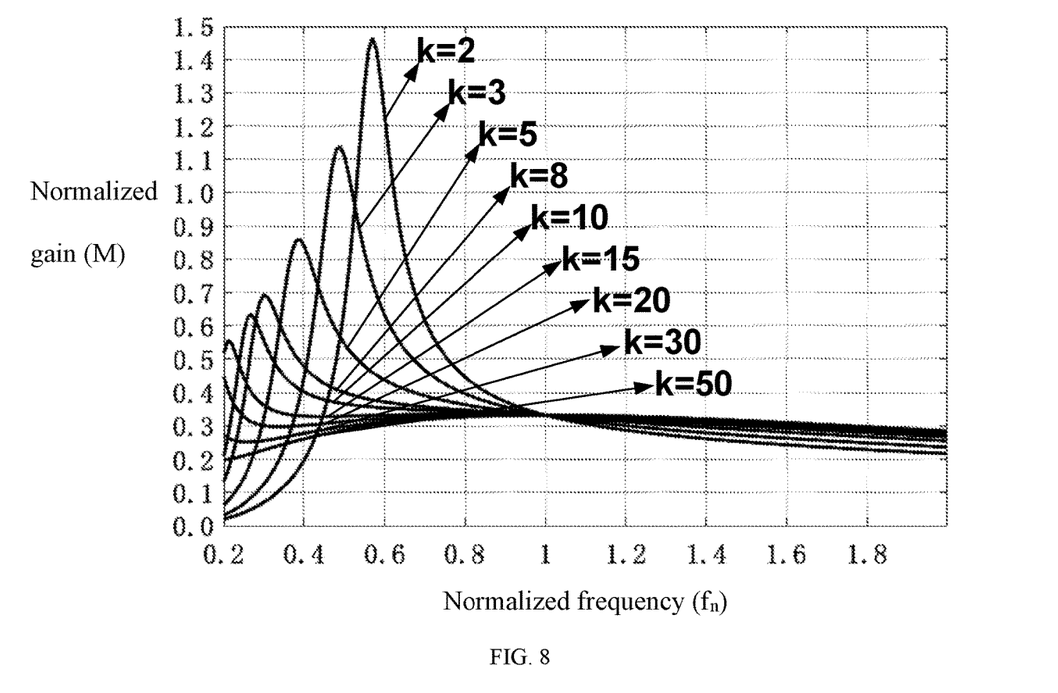
FIG. 8 shows gain curves under different k values when Q=0.2 and m=0.8 according to an embodiment of the three-phase CLLC bidirectional DC-DC converter of the present invention.
Figure 9:
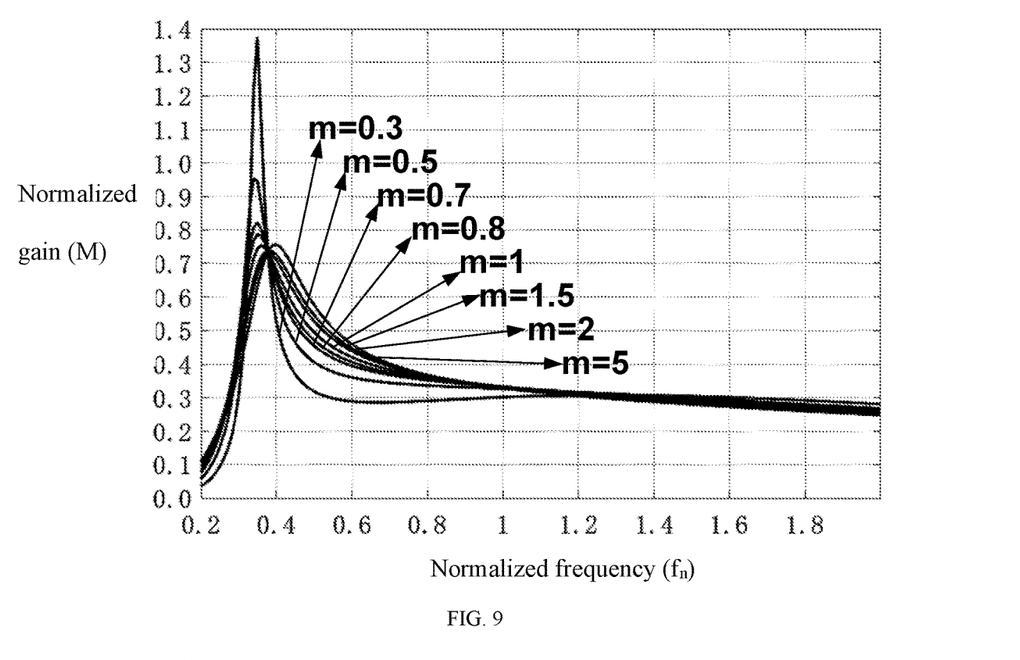
FIG. 9 shows gain curves under different m values when k=6 and Q=0.2 according to an embodiment of the three-phase CLLC bidirectional DC-DC converter of the present invention.

FIG. 7 shows gain curves under different Q values when k=6 and m=0.8 according to an embodiment of the three-phase CLLC bidirectional DC-DC converter of the present invention; FIG. 8 shows gain curves under different k values when Q=0.2 and m=0.8 according to an embodiment of the three-phase CLLC bidirectional DC-DC converter of the present invention; and FIG. 9 shows gain curves under different m values when k=6 and Q=0.2 according to an embodiment of the three-phase CLLC bidirectional DC-DC converter of the present invention. FIGS. 7-9 illustrate the following: (1) When k=6, m=0.8, and Q sequentially takes the values of 0.1, 0.2, 0.5, 0.8, 1, 1.5 and 2, respectively, there is a fixed point at which no matter how the Q value changes, the voltage gain of the converter remains unchanged, and the gain value is ⅓. At other points, as the Q value increases, the voltage gain decreases under the same frequency. (2) When Q=0.2, m=0.8, and k sequentially takes the values of 2, 3, 5, 8, 10, 15, 20, 30 and 50, respectively, and when the resonant frequency is equal to the switching frequency, no matter how the k value changes, the voltage gain of the converter remains unchanged, and the gain value is ⅓. Meanwhile, as the k value increases, the maximum voltage gain decreases, and the gain curve region is stable. (3) When k=6, Q=0.2, and m sequentially takes the values of 0.3, 0.5, 0.7, 0.8, 1, 1.5, 2 and 5, respectively, in the low-frequency region, there is a fixed point (i.e. the point where the normalized frequency $f_n \approx 0.38$ in FIG. 9) at which no matter how the m value changes, the voltage gain of the converter remains unchanged. At other points, as the m value decreases, the peak voltage gain gradually increases. Since the general converter has a relatively small Q value and a relatively large k value, when m<1, the voltage gain changes significantly with the m value; and when m>1, the voltage gain curve changes slightly.

The above analysis shows that the gain characteristics of the converter are affected by Q, k, and m values, and coupled to each other. In specific applications, Q, k, and m values can be designed according to the gain range and output power range of the converter.

The voltage gain of the converter can be changed by changing the switching frequency of the $S_n$ bridge arm and the $P_n$ bridge arm. Under purely resistive load condition, that is, when the switching frequency is equal to the resonant frequency, the phase-a voltage gain can be simplified as shown in formula (9):

$$M_A = \frac{1}{\sqrt{Q^2\left(1-\frac{1}{m}\right)^2 + 1}}. \qquad \text{formula (9)}$$

The above formula shows that when m≠1, the gain of the CLLC bidirectional converter under the purely resistive load condition is related to the quality factor Q of the primary side; and when m=1, the gain of the CLLC bidirectional converter under the pure resistive load condition is 1, and independent of the load.

When energy is transferred from the low-voltage side to the high-voltage side, the converter gain is $1/M_A$. When m=1, $M_A=1/M_A=1$, namely, the bidirectional voltage gains of the converter are both 1, and the forward characteristics are the same as the reverse characteristics.

Different connection methods of the primary and secondary windings of a, b, and c three-phase transformer are taken into account, and the gain of the transformer is set as $M_T$. When energy is transferred from the high-voltage side to the low-voltage side, the voltage gain of the three-phase CLLC bidirectional DC-DC converter of the present invention is shown in formula (10):

$$M = \frac{M_A M_T}{3}. \qquad \text{formula (10)}$$

The different connection methods of the primary and secondary windings of the three-phase transformer have different values of the transformer gain $M_T$, specifically as follows:

(1) Star connection of the primary winding and star connection of the secondary winding: $M_T=1$;

(2) Star connection of the primary winding and delta connection of the secondary winding: $M_T=\sqrt{3}$;

(3) Delta connection of the primary winding and delta connection of the secondary winding: $M_T=1$; and (4) Delta connection of the primary winding and star connection of the secondary winding: $M_T=1/\sqrt{3}$.

Figure 10:
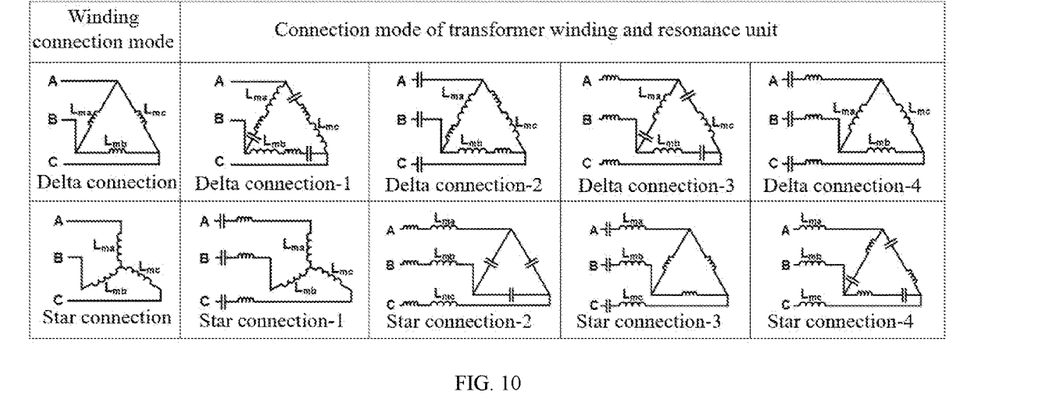
FIG. 10 is a structural schematic diagram showing different connection methods of the three-phase transformer and the primary and secondary side resonant modules according to an embodiment of the three-phase CLLC bidirectional DC-DC converter of the present invention.

FIG. 10 is a structural schematic diagram showing different connection methods of the three-phase transformer and the primary and secondary side resonant modules according to an embodiment of the three-phase CLLC bidirectional DC-DC converter of the present invention. The winding connection includes winding delta connection and winding star connection. The connection of the transformer windings and the resonant module has eight connection methods, including four types of delta connection and four types of star connection.

Those skilled in the art can clearly understand that for convenience and concision of the description, the specific working process and related description of the above-mentioned system can refer to the corresponding process in the foregoing embodiment of the method, which are not repeatedly described herein.

It should be noted that the three-phase CLLC bidirectional DC-DC converter and the method for controlling the same provided in the foregoing embodiments are only illustrated by the division of the above-mentioned functional modules. In practical applications, the above functions can be allocated by different functional modules as needed, namely, the modules or steps in the embodiments of the present invention are decomposed or combined. For example, the modules of the foregoing embodiments can be combined into one module, or further divided into multiple sub-modules to complete all or part of the functions described above. The designations of the modules and steps involved in the embodiments of the present invention are only used to distinguish these modules or steps, and should not be construed as an improper limitation to the present invention.

The terminologies "first", "second", and the like are used to distinguish similar objects, rather than to describe or indicate a specific order or sequence.

The terminology "include/comprise" or any other similar terminologies are intended to cover non-exclusive inclusion, so that a process, method, article or equipment/device that includes a series of elements includes not only those elements, but also other elements that are not explicitly listed, or further includes the elements inherent in the process, method, article or equipment/device.

Hereto, the technical solutions of the present invention have been described with reference to the preferred embodiments and drawings. However, those skilled in the art can easily understand that the scope of protection of the present invention is obviously not limited to these specific embodiments. Without departing from the principle of the present invention, those skilled in the art can make equivalent modifications or replacements to the relevant technical features, and the technical solutions obtained by these modifications or replacements shall fall within the scope of protection of the present invention.

What is claimed is:

1. A three-phase CLLC bidirectional DC-DC converter, comprising:
   a high-voltage side voltage dividing capacitor module,
   a three-phase half-bridge series module,
   a three-phase primary side resonant module,
   a three-phase isolation transformer,
   a three-phase secondary side resonant module,
   a three-phase half-bridge parallel module, and
   a low-voltage side capacitor module; wherein
   the high-voltage side voltage dividing capacitor module, the three-phase half-bridge series module, the three-phase primary side resonant module, the three-phase isolation transformer, the three-phase secondary side resonant module, the three-phase half-bridge parallel module and the low-voltage side capacitor module are connected in sequence;
   the high-voltage side voltage dividing capacitor module is configured to divide a high-voltage side voltage to obtain a divided high-voltage side voltage, smooth a direct current (DC) bus voltage to obtain a divided DC bus voltage, and absorb a high pulse current of the three-phase half-bridge series module;
   the three-phase half-bridge series module is configured to modulate the divided DC bus voltage into a first high-frequency AC square wave when energy is transferred from a high-voltage side to a low-voltage side; and to rectify a high-frequency AC voltage into a first DC voltage when the energy is transferred from the low-voltage side to the high-voltage side, wherein the high-frequency AC voltage is transferred from the three-phase isolation transformer;
   the three-phase primary side resonant module cooperates with the three-phase secondary side resonant module to softly switch two first switches and two second switches;
   the three-phase isolation transformer is configured to electrically isolate a primary side from a secondary side and transfer the energy between the primary side and the secondary side;

the three-phase half-bridge parallel module is configured to rectify the high-frequency AC voltage into a second DC voltage when the energy is transferred from the high-voltage side to the low-voltage side; and to modulate a low-voltage DC bus voltage into a second high-frequency AC square wave when the energy is transferred from the low-voltage side to the high-voltage side; and the low-voltage side capacitor module is configured to smooth the low-voltage DC bus voltage and absorb a high pulse current of the three-phase half-bridge parallel module;

wherein, the high-voltage side voltage dividing capacitor module comprises a voltage dividing capacitor $C_{H1}$, a voltage dividing capacitor $C_{H2}$, and a voltage dividing capacitor $C_{H3}$; and a voltage of each of the voltage dividing capacitor $C_{H1}$, the voltage dividing capacitor $C_{H2}$, and the voltage dividing capacitor $C_{H3}$ is ⅓ of the high-voltage side voltage, wherein, the three-phase half-bridge series module comprises a bridge arm $S_1$, a bridge arm $S_2$ and a bridge arm $S_3$, wherein the $S_1$, the $S_2$ and the $S_3$ are connected in series; each of the $S_1$, the $S_2$ and the $S_3$ comprises the two first switches connected in series; and a series connection point of the two first switches of the $S_1$ is used as a midpoint of the $S_1$; a series connection point of the two first switches of the $S_2$ is used as a midpoint of the $S_2$; and a series connection point of the two first switches of the $S_1$ is used as a midpoint of the $S_3$, wherein, the three-phase half-bridge parallel module comprises a bridge arm $P_1$, a bridge arm $P_2$ and a bridge arm $P_3$, wherein the $P_1$, the $P_2$ and the $P_3$ are connected in parallel; each of the $P_1$, the $P_2$ and the $P_3$ comprises the two second switches connected in series; and a series connection point of the two second switches of the $P_1$ is used as a midpoint of the $P_1$; a series connection point of the two second switches of the $P_2$ is used as a midpoint of the $P_2$; and a series connection point of the two second switches of the $P_3$ is used as a midpoint of the $P_3$, wherein, the three-phase primary side resonant module comprises a phase-a primary side resonant tank, a phase-b primary side resonant tank, and a phase-c primary side resonant tank, and each of the phase-a primary side resonant tank, the phase-b primary side resonant tank and the phase-c primary side resonant tank comprises a primary side resonant capacitor $C_{rpa}$, a primary side resonant inductor $L_{rpa}$, a primary side resonant capacitor $C_{rpb}$, a primary side resonant inductor $L_{rpb}$, a primary side resonant capacitor $C_{rpc}$ and a primary side resonant inductor $L_{rpc}$, respectively, wherein, the three-phase secondary side resonant module comprises a phase-a secondary side resonant tank, a phase-b secondary side resonant tank and a phase-c secondary side resonant tank, the phase-a secondary side resonant tank comprises a secondary side resonant capacitor $C_{rsa}$ and a secondary side resonant inductor $L_{rsa}$, the phase-b secondary side resonant tank comprises a secondary side resonant capacitor $C_{rsb}$ and a secondary side resonant inductor $L_{rsb}$, and the phase-c secondary side resot tank comprises a secondary side resonant capacitor $C_{rsc}$ and a secondary side resonant inductor $L_{rsc}$, wherein, the three-phase isolation transformer comprises a three-phase primary winding and a three-phase secondary winding, phases of the three-phase primary winding are coupled to phases of the three-phase primary side resonant module, respectively; phases of the three-phase secondary winding are coupled to phases of the secondary side resonant module, respectively, the three-phase primary winding comprises a first terminal $T_{a1}$, a second terminal $T_{a2}$, a first terminal $T_{b1}$, a second terminal $T_{b2}$, a first terminal $T_{c1}$ and a second terminal $T_{c2}$, the $C_{rpa}$ and the $L_{rpa}$ are connected in series between the $T_{a1}$ and the midpoint of the $S_1$, the $C_{rpb}$ and the $L_{rpb}$ are connected in series between the $T_{b1}$ and the midpoint of the $S_2$, the $C_{rpc}$ and the $L_{rpc}$ are connected in series between the $T_{c1}$ and the midpoint of the $S_3$, the $L_{rpb}$ is connected between the $T_{a2}$ and the $T_{b1}$, wherein the $L_{rpb}$, the $T_{a2}$ and the $T_{b1}$ are connected in series, the $L_{rpc}$ is connected between the $T_{b2}$ and the $T_{c1}$, wherein the $L_{rpc}$, the $T_{b2}$ and the $T_{c1}$ are connected in series, wherein the $L_{rpa}$ is connected between the $T_{c2}$ and the $T_{a1}$, wherein the $L_{rpa}$, the $T_{c2}$, and the $T_{a1}$ are connected in series, and wherein, the three-phase secondary winding comprises a third terminal $T_{a3}$, a fourth terminal $T_{a4}$, a third terminal $T_{b3}$, a fourth terminal $T_{b4}$, a third terminal $T_{c3}$, and a fourth terminal $T_{c4}$, the $C_{rsa}$ and the $L_{rsa}$ are connected in series between the $T_{a3}$ and the midpoint of the $P_1$, the $C_{rsb}$ and the $L_{rsb}$ are connected in series between the $T_{b3}$ and the midpoint of the $P_2$, the $C_{rsc}$ and the $L_{rsc}$ are connected in series between the $T_{c3}$ and the midpoint of the $P_3$, the $L_{rsb}$ is connected between the $T_{a4}$ and the $T_{b3}$, wherein the $L_{rsb}$, the $T_{a4}$ and the $T_{b3}$ are connected in series, the $L_{rsc}$ is connected between the $T_{b4}$ and the $T_{c3}$, wherein the $L_{rsc}$, the $T_{b4}$ and the $T_{c3}$ are connected in series, the $L_{rsa}$ is connected between the $T_{b4}$ and the $T_{a3}$, wherein the $L_{rsa}$, the $T_{b4}$ and the $T_{a3}$ are connected in series.

2. The three-phase CLLC bidirectional DC-DC converter according to claim 1, wherein,
the three-phase CLLC bidirectional DC-DC converter is configured to transfer the energy forward from the high-voltage side to the low-voltage side; or transfer the energy reversely from the low-voltage side to the high-voltage side.

3. The three-phase CLLC bidirectional DC-DC converter according to claim 1, wherein,
three phases of the three-phase primary side resonant module are symmetrical with three phases of the three-phase secondary side resonant module.

4. The three-phase CLLC bidirectional DC-DC converter according to claim 1,
wherein, the three-phase isolation transformer is a magnetic integrated transformer.

5. A method for controlling the three-phase CLLC bidirectional DC-DC converter according to claim 1, comprising:
step S10, setting the two first switches and the two second switches according to a direction; wherein the energy is transferred in the direction; if the energy is transferred forward, proceeding to step S20; if the energy is transferred reversely, proceeding to step S30;
step S20, setting the two first switches of each of the bridge arm S1, the bridge arm S2 and the bridge arm S3 to be complementarily turned on in a first duty cycle of 50%, and setting a driving time sequence of the bridge arm S1, a driving time sequence of the bridge arm S2 and a driving time sequence of the bridge arm S3 to differ by 120° in sequence; setting the two second switches of each of the bridge arm P1, the bridge arm P2 and the bridge arm P3 to work in a synchronous rectification mode or an uncontrolled rectification mode, and proceeding to step S40;

step S30, setting the two second switches of each of the bridge arm P1, the bridge arm P2 and the bridge arm P3 to be complementarily turned on in a second duty cycle of 50%, and setting a driving time sequence of the bridge arm P1, a driving time sequence of the bridge arm P2 and a driving time sequence of the bridge arm P3 to differ by 120° in sequence; setting the two first switches of each of the bridge arm S1, the bridge arm S2 and the bridge arm S3 to work in the synchronous rectification mode or the uncontrolled rectification mode, and proceeding to step S50;

step S40, modulating the divided high-voltage side voltage into a third high-frequency AC square wave through the bridge arm S1, the bridge arm S2 and the bridge arm S3, respectively, and transmitting the third high-frequency AC square wave to the three-phase isolation transformer through the three-phase primary side resonant module; wherein during a first switch mode switching process, the two first switches of each of the bridge arm S1, the bridge arm S2 and the bridge arm S3 are softly switched through the three-phase primary side resonant module; and rectifying a high-frequency alternating voltage on the secondary side of the three-phase isolation transformer into a DC through the bridge arm P1, the bridge arm P2 and the bridge arm P3; wherein during the first switch mode switching process of the primary side, the two second switches of each of the bridge arm P1, the bridge arm P2 and the bridge arm P3 are softly switched through the three-phase secondary side resonant module, and an input voltage is transferred from the high-voltage side to the low-voltage side to convert a first high-voltage DC to a first low-voltage DC; and step S50, modulating a low-voltage side voltage into a high-frequency AC square wave through the bridge arm P1, the bridge arm P2 and the bridge arm P3, respectively, and transmitting the high-frequency AC square wave to the three-phase isolation transformer through the three-phase secondary side resonant module; wherein during the first switch mode switching process, the two second switches of each of the bridge arm P1, the bridge arm P2 and the bridge arm P3 are softly switched through the three-phase secondary side resonant module; and rectifying a high-frequency alternating voltage on the primary side of the three-phase isolation transformer into a DC to obtain a rectified DC voltage through the bridge arm S1, the bridge arm S2 and the bridge arm S3; wherein the rectified DC voltage is superimposed in series through the high-voltage side voltage dividing capacitor module, during a second switch mode switching process of the secondary side, the two first switches of each of the bridge arm S1, the bridge arm S2 and the bridge arm S3 are softly switched through the three-phase primary side resonant module, and the input voltage is transferred from the low-voltage side to the high-voltage side to convert a second low-voltage DC to a second high-voltage DC.

\* \* \* \* \*